(12) United States Patent
Zhang (10) Patent No.: US 12,282,114 B2
(45) Date of Patent: Apr. 22, 2025

(54) VEHICLE AND VEHICLE CONTROL METHOD

(71) Applicant: PATEO CONNECT+ Technology (Shanghai) Corporation, Shanghai (CN)

(72) Inventor: Yu Zhang, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 181 days.

(21) Appl. No.: 17/976,437

(22) Filed: Oct. 28, 2022

(65) Prior Publication Data
US 2023/0194663 A1   Jun. 22, 2023

(30) Foreign Application Priority Data

Dec. 16, 2021   (CN) .......................... 202111561686.8

(51) Int. Cl.
| | |
|---|---|
| *G01S 7/41* | (2006.01) |
| *B60R 16/037* | (2006.01) |
| *G01S 7/282* | (2006.01) |
| *G01S 13/02* | (2006.01) |
| *G06F 3/01* | (2006.01) |
| *B60R 25/20* | (2013.01) |
| *E05F 15/73* | (2015.01) |

(52) U.S. Cl.
CPC ............ *G01S 7/412* (2013.01); *B60R 16/037* (2013.01); *G01S 7/282* (2013.01); *G01S 7/415* (2013.01); *G01S 13/0209* (2013.01); *G06F 3/017* (2013.01); *B60R 25/2045* (2013.01); *E05F 15/73* (2015.01); *E05Y 2400/42* (2013.01); *E05Y 2400/86* (2013.01); *E05Y 2900/53* (2013.01)

(58) Field of Classification Search
CPC .......... G01S 7/412; G01S 7/282; G01S 7/415; G01S 13/0209; G01S 7/41; G01S 13/931; B60R 16/037; B60R 25/2045; G06F 3/017; E05F 15/73; E05Y 2400/42; E05Y 2400/86; E05Y 2900/53; B60W 50/08
See application file for complete search history.

(56) References Cited

U.S. PATENT DOCUMENTS

| | | | |
|---|---|---|---|
| 2017/0060254 A1* | 3/2017 | Molchanov | ............ G06N 3/082 |
| 2017/0300120 A1* | 10/2017 | Tendyck | .............. G06V 40/107 |

(Continued)

FOREIGN PATENT DOCUMENTS

CN           113453147 A        9/2021

*Primary Examiner* — Abdalla A Khaled
(74) *Attorney, Agent, or Firm* — ANOVA LAW GROUP, PLLC (57) ABSTRACT

A vehicle control method includes emitting a plurality of pulse signals through a plurality of ultra-wideband (UWB) antennas. The plurality of pulse signals are reflected by an obstacle during outward propagation to generate a plurality of reflected signals. The method further includes receiving the reflected signals and determining time-of-flight (TOF) and signal strength of each of the received reflected signals, determining whether the obstacle is a hand according to the TOF and the signal strength of each of the reflected signals, in response to determining that the obstacle is the hand, recognizing a gesture of the hand, and outputting an operation command corresponding to the gesture to control a vehicle to perform a corresponding operation.

19 Claims, 4 Drawing Sheets

(56) References Cited

U.S. PATENT DOCUMENTS

| | | | |
|---|---|---|---|
| 2017/0351336 A1* | 12/2017 | Yang | G06F 3/017 |
| 2019/0071055 A1* | 3/2019 | Luchner | H04L 63/0861 |
| 2020/0057546 A1* | 2/2020 | Zhao | G06F 3/013 |
| 2020/0086881 A1* | 3/2020 | Abendroth | G10L 17/00 |
| 2020/0408009 A1* | 12/2020 | Bussis | E05B 81/78 |
| 2021/0179020 A1* | 6/2021 | Hasegawa | G07C 5/008 |
| 2021/0237715 A1* | 8/2021 | Hassani | G06F 3/015 |
| 2021/0253120 A1* | 8/2021 | Ahire | B60W 50/08 |
| 2021/0256316 A1* | 8/2021 | Ahire | H04L 9/50 |
| 2021/0311554 A1* | 10/2021 | McFarland, Jr. | G06V 40/28 |
| 2022/0031197 A1* | 2/2022 | McFarland, Jr. | B60K 35/10 |
| 2022/0067402 A1* | 3/2022 | An | G06V 20/58 |
| 2022/0242370 A1* | 8/2022 | Oman | H04W 4/40 |
| 2022/0247854 A1* | 8/2022 | Oman | B60K 35/65 |

* cited by examiner

VEHICLE AND VEHICLE CONTROL METHOD

CROSS-REFERENCE TO RELATED APPLICATION

This application claims priority to Chinese Patent Application No. 202111561686.8, filed on Dec. 16, 2021, the entire content of which is incorporated herein by reference.

TECHNICAL FIELD

The present disclosure relates to the vehicle control field and, more particularly, to a method of controlling a vehicle by recognizing a gesture based on an ultra-wideband (UWB) and the vehicle that is controlled by the gesture.

BACKGROUND

When a user wants to control a vehicle from outside the vehicle, for example, to open and close a door, lock a door, open and close a window, open and close front and rear trunks, switch music, adjust a volume, control light, etc., the user often needs to enter the vehicle to perform such operations, or press a button outside of the vehicle (when opening the trunk), which is time-consuming and labor-intensive.

Although a portable electronic apparatus such as a wireless key, a cellphone, etc., can be used to perform control from the outside of the vehicle, this manner requires an additional apparatus. When the wireless key is lost or the portable apparatus is unavailable, these operations are more difficult to be performed.

When a single ultra-wideband (UWB) antenna is used to recognize a gesture, accuracy of micro-gesture recognition is insufficient due to a blind area of the detection of the single UWB antenna. Therefore, it is desirable to implement a simpler and more precise method of controlling the vehicle from the outside of the vehicle.

SUMMARY

Embodiments of the present disclosure provide a vehicle control method. The method includes emitting a plurality of pulse signals through a plurality of ultra-wideband (UWB) antennas. The plurality of pulse signals are reflected by an obstacle during outward propagation to generate a plurality of reflected signals. The method further includes receiving the reflected signals and determining time-of-flight (TOF) and signal strength of each of the received reflected signals, determining whether the obstacle is a hand according to the TOF and the signal strength of each of the reflected signals, in response to determining that the obstacle is the hand, recognizing a gesture of the hand, and outputting an operation command corresponding to the gesture to control a vehicle to perform a corresponding operation.

Embodiments of the present disclosure provide an electronic apparatus, including a memory and a processor. The memory stores a program. The processor is coupled with the memory and, when the program being executed, configured to periodically emit a plurality of pulse signals through a plurality of ultra-wideband (UWB) antennas. The plurality of pulse signals are reflected by an obstacle during outward propagation to generate a plurality of reflected signals. The processor is further configured to receive the reflected signals and determine a time-of-flight (TOF) and a signal strength of each of the received reflected signals, determine whether the obstacle is a hand according to the TOF and the signal strength of each of the reflected signals, in response to determining that the obstacle is the hand, recognize a gesture of the hand, and output an operation command corresponding to the gesture to control a vehicle to perform a corresponding operation.

Embodiments of the present disclosure provide a vehicle, including a body, an ultra-wideband (UWB) apparatus, and a controller. The UWB apparatus is arranged outside of the body and includes a plurality of UWB antennas. The plurality of UWB antennas periodically emit a plurality of pulse signals and receive a plurality of reflected signals generated by being reflected by an obstacle. The controller is communicatively connected to the UWB apparatus. The controller is configured to determine time-of-flight (TOF) and signal strength of each of the received reflected signals, determine whether the obstacle is a hand according to the TOF and the signal strength of each of the reflected signals, in response to determining that the obstacle is the hand, recognize a gesture of the hand, and output an operation command corresponding to the gesture to control the vehicle to perform a corresponding operation.

DETAILED DESCRIPTION OF THE EMBODIMENTS

In order to better understand the present disclosure, various aspects of the present disclosure are described in more detail with reference to the accompanying drawings. These detailed descriptions are merely descriptions of exemplary embodiments of the present disclosure and are not intended to limit the scope of the present disclosure. Throughout this specification, the expression "and/or" includes any and all combinations of one or more of the associated listed items.

In the present disclosure, an order in which the steps of the processes are described does not necessarily represent an order in which the processes are followed in an actual operation unless otherwise specified or limited or can be deduced from the context.

The expressions such as "includes," "included with," "has," "contains," and/or "contained with" in this specification are open-ended rather than closed expressions, which indicate the presence of the features, elements, and/or components listed and do not exclude the presence of one or more other features, elements, components, and/or combinations thereof. In addition, when an expression such as "at least one of" is after a listed feature, the expression decorates the whole feature not only an individual element of the listed features. In addition, when embodiments of the present disclosure are described, "may" is used to indicate "one or more embodiments of the present disclosure." Further, the expression "exemplary" is intended to refer to an example or illustration.

Unless otherwise specified, all terms (including engineering and scientific terms) used herein have the same meaning as commonly understood by those of ordinary skill in the art. Unless expressly stated in the present disclosure, words defined in a commonly used dictionary should be understood as having meanings consistent with their meanings in the context of the related technology, rather than being explained in an idealized or excessively formal manner.

When there is no conflict, embodiments and features of embodiments of the present disclosure may be combined with each other.

Embodiments of the present disclosure are described below with reference to the accompanying drawings.

Figure 1:
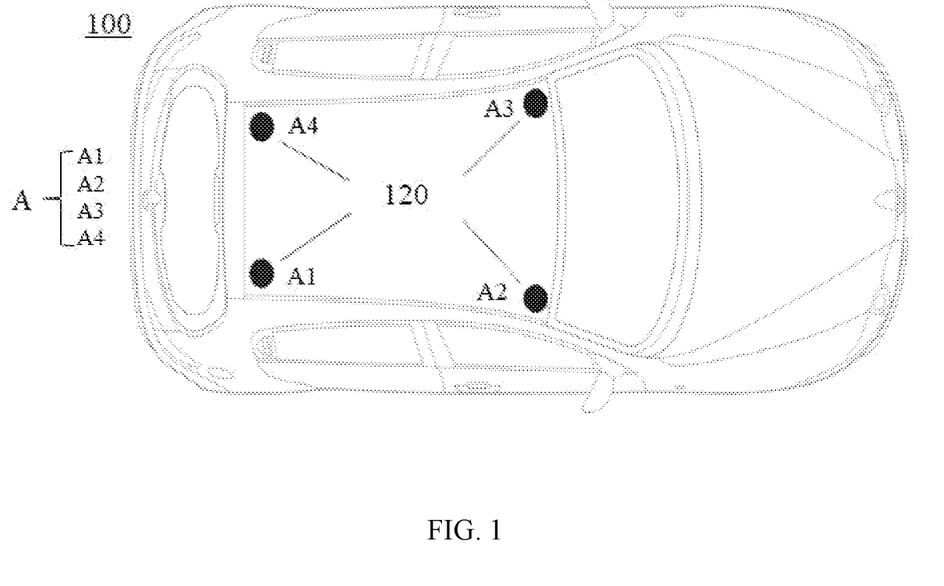
FIG. 1 is a schematic diagram of a vehicle arranged with an ultra-wideband (UWB) apparatus according to some embodiments of the present disclosure.

FIG. 1 is a schematic diagram of a vehicle arranged with an ultra-wideband (UWB) apparatus 120 according to some embodiments of the present disclosure.

In some embodiments, the UWB apparatus 120 is arranged on a top of a vehicle 100. The UWB apparatus 120 includes at least one UWB antenna A. For example, as shown in FIG. 1, the UWB apparatus 120 includes four UWB antennas A1 to A4. The four UWB antennas A1 to A4 are arranged on an outer side of a roof of the vehicle 100. However, although FIG. 1 shows that a plurality of UWB antennas A of the UWB apparatus 120 are arranged on the outer side of the roof of the vehicle 100, the present disclosure is not limited to this. The UWB apparatus 120 may be arranged at a plurality of positions on vehicle 100 without departing from the teaching and spirit of the present disclosure. For example, the UWB apparatus 120 may be arranged on at least one of two sides, a rear side, or a front side of the vehicle 100. In some other embodiments, a part of the plurality of UWB antennas A of the UWB apparatus 120 may be arranged on the roof of the vehicle 100, and another part of the plurality of UWB antennas A may be arranged on a side of the vehicle 100. In addition, although not shown in the drawings, one or more UWB antennas A may also be arranged inside the vehicle 100. Since the vehicle 100 includes the UWB apparatus 120, even if a user makes a gesture outside the vehicle 100, the gesture can be recognized by the UWB apparatus 120. Thus, the user may control the vehicle 100 without using any mobile devices or having any substantial contact with the vehicle 100. Therefore, user experience may be improved.

Figure 2:
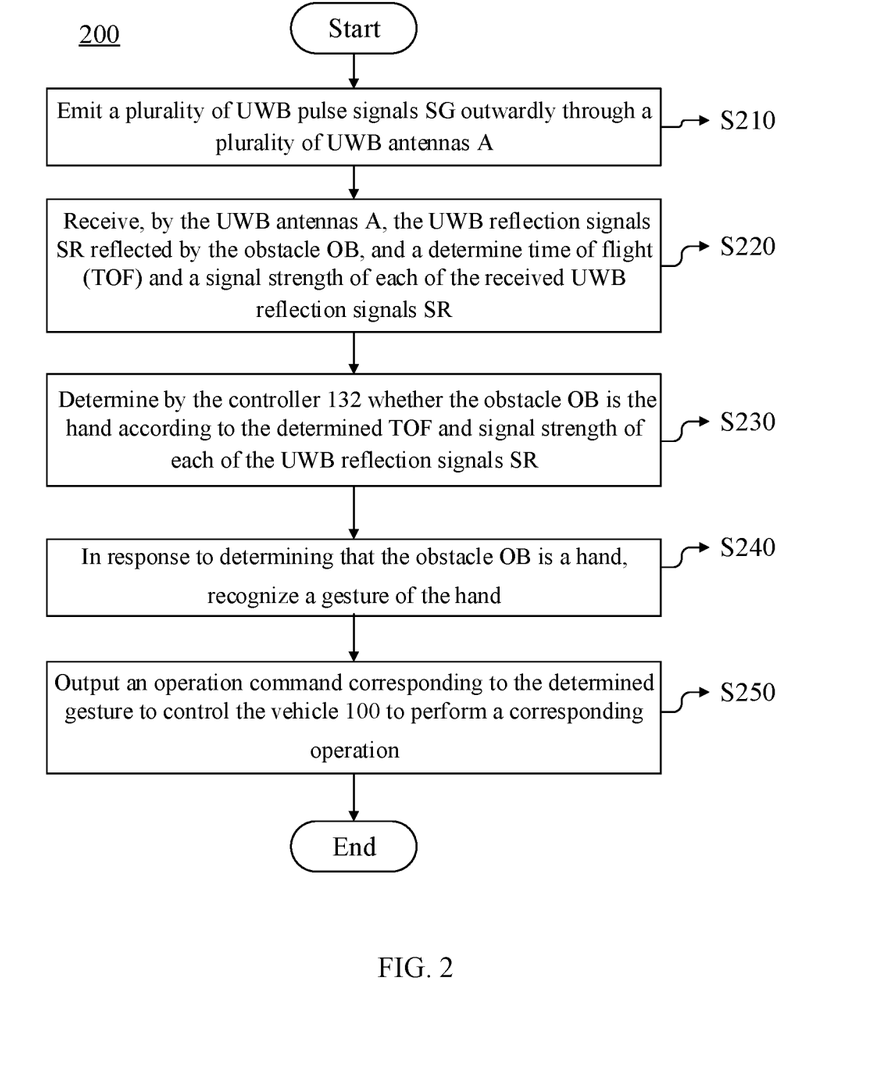
FIG. 2 is a schematic flowchart of a vehicle control method according to some embodiments of the present disclosure.
Figure 3:
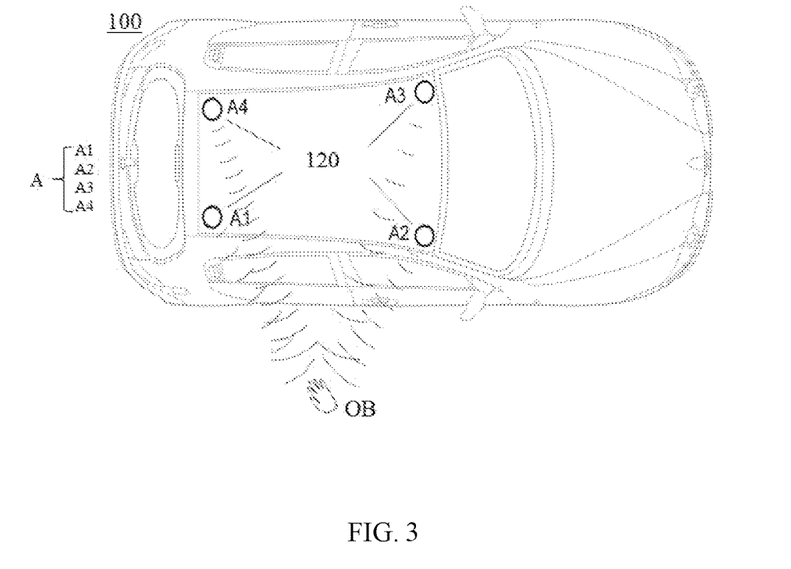
FIG. 3 is a schematic diagram showing signal propagation of a UWB antenna arranged outside of a vehicle according to some embodiments of the present disclosure.
Figure 4:
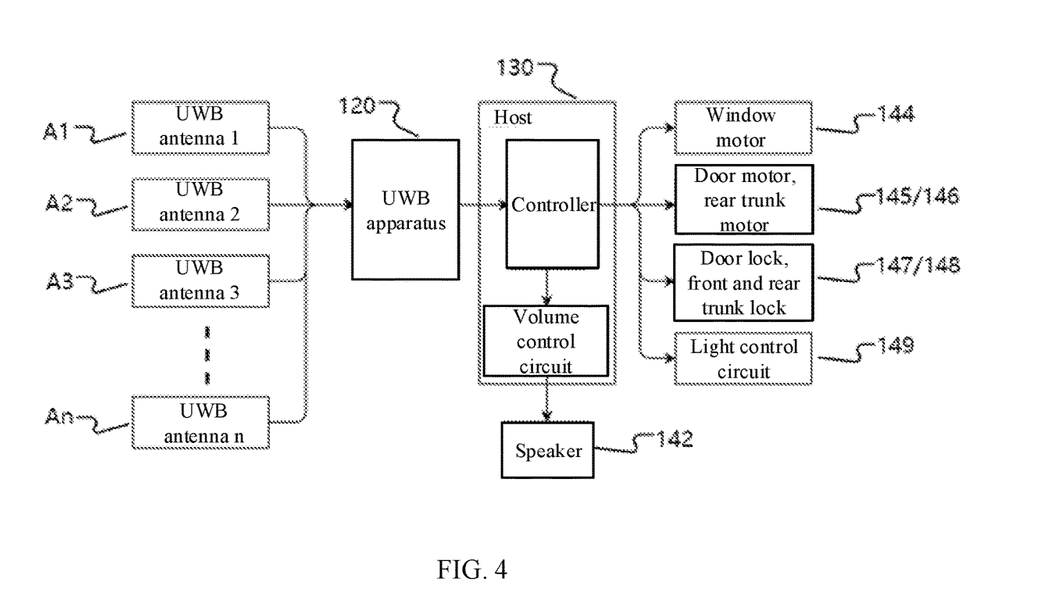
FIG. 4 is a schematic block diagram showing a hardware system configured to implement a vehicle control method according to some embodiments of the present disclosure.

FIG. 2 is a schematic flowchart of a vehicle control method according to some embodiments of the present disclosure. FIG. 3 is a schematic diagram showing signal propagation of a UWB antenna arranged outside of a vehicle according to some embodiments of the present disclosure. FIG. 4 is a schematic block diagram showing a hardware system configured to implement a vehicle control method according to some embodiments of the present disclosure.

A principle of controlling the vehicle by recognizing the gesture based on the UWB is described below with reference to FIG. 2 to FIG. 4.

As shown in FIG. 2, at S210, the UWB apparatus 120 is configured to emit a plurality of UWB pulse signals SG outwardly through a plurality of UWB antennas A. The plurality of UWB pulse signals SG may be reflected by an obstacle OB when being outwardly propagated to generate a plurality of UWB reflected signals SR.

For example, as shown in FIG. 3, the plurality of UWB antennas A of the UWB apparatus 120 arranged on the outer side of the roof of the vehicle 100 may emit the UWB pulse signals SG outwardly at a specific frequency. Each of the plurality of UWB pulse signals SG encounters the obstacle OB and is reflected when being outwardly propagated. For example, when the user makes a gesture in a predetermined range outside the vehicle 100 or inside the vehicle 100, the UWB pulse signals SG emitted by the plurality of UWB antennas A are blocked by a hand of the user as the obstacle OB to generate the UWB reflected signals SR.

At S220, the UWB antennas A may receive the UWB reflection signals SR reflected by the obstacle OB, and determine time-of-flight (TOF) and signal strength of each of the received UWB reflection signals SR. As shown in FIG. 3, the UWB apparatus 120 may be configured to receive the UWB reflected signals SR reflected by the obstacle OB through the UWB antennas A and process the received UWB reflected signals SR. For example, the UWB apparatus 120 may be configured to input the received UWB reflection signals SR to a controller 132 of a host 130. The controller 132 may be, for example, a system on a chip (SOC). The controller 132 of the host 130 may be configured to extract signal features of the UWB reflected signals SR, and analyze the UWB reflected signals SR based on the extracted signal features. The controller 132 may be configured to determine the TOF and signal strength of each of the UWB reflected signals SR according to the extracted signal features of the UWB reflected signals SR.

At S230, the controller 132 may be configured to determine whether the obstacle OB is the hand according to the determined TOF and signal strength of each of the UWB reflection signals SR.

In the process of determination of the TOF, each of the UWB antennas A may be configured to emit a UWB pulse signal SG in a certain direction, and timing may be started simultaneously when the UWB pulse signal SG is emitted. The UWB pulse signal SG may be propagated in the air and return immediately when the UWB pulse signal SG encounters an obstacle OB during the propagation. The UWB antenna A may stop timing as soon as the UWB antenna receives the UWB reflected signal SR. Assume that a propagation speed of the UWB pulse signals SG in the air is v, according to the time t recorded by the timer, a distance s between each of the UWB antennas A and the obstacle OB may be calculated, that is $s=v*t/2$. Depth information of the obstacle OB may be obtained according to the calculated distance between each of the UWB antennas A and the obstacle OB.

In addition, since different media have different reflectivity, the medium that forms the obstacle OB may be determined by determining the signal strength of each of the UWB reflected signals SR.

For example, when the depth information of the UWB reflection signal SR determined according to the TOF exceeds a certain depth range, the obstacle OB may be determined to be not a hand. In addition, when the signal strength of the UWB reflection signal SR exceeds a certain range, the obstacle OB may also be determined to be not a hand. That is, only when the depth information and the signal strength of the UWB reflected signals SR determined according to the TOF both satisfy a certain condition, the obstacle OB may be determined to be a hand.

For example, a recognition process of the obstacle OB may be described by taking the UWB apparatus 120 including the four UWB antenna A1 to A4 as an example.

Referring to FIG. 3, the four UWB antennas A1 to A4 are arranged on the vehicle 100 with distances as far away as possible from each other. In some embodiments, the four UWB may be arranged to form a polygon shape and may not be arranged in a straight line. The four UWB antennas A1 to A4 may simultaneously emit UWB pulse signals SG with frequencies f1 to f4, respectively. After the UWB pulse signals SG of the four frequencies are propagated in the air, the UWB pulse signals SG may encounter an obstacle OB and be reflected. The pulse signals with different frequencies may be emitted by controlling the plurality of (e.g., four) UWB antennas to recognize the gesture to control the vehicle from the outside of the vehicle. Thus, the precision of the vehicle control may be improved.

Each of the four UWB antennas A1 to A4 may receive the UWB reflected signals SR of the four frequencies f1 to f4. According to the known position of each of the UWB antennas A, the TOF of the UWB pulse signal SG of each frequency, and the signal strength of the received UWB reflected signal SR of each frequency, the controller 132 may be configured to establish the position and shape of the spatial obstacle OB obtained from an angle of the UWB antenna A through computation.

For example, in order to obtain the spatial three-dimensional shape of the obstacle OB, the obstacle OB may be divided into a plurality of units in space (e.g., a plurality of points B1, . . . , Bn). For each of the four UWB antennas A1 to A4, a precise spatial position of each of the plurality of units that form the obstacle OB may be determined according to the determined TOF of each of the UWB pulse signals SG. After the precise spatial position of each of the plurality of units is obtained, the precise spatial position of each of the plurality of units may be combined to obtain the spatial three-dimensional shape of the obstacle OB.

The controller 132 may be configured to synthesize a more complete spatial 3D model of the obstacle OB through the sub-spatial 3D models of the obstacle OB obtained based on the angles of the four UWB antennas A1 to A4. Thus, whether the obstacle OB is a hand may be determined.

At S240, in response to determining that the obstacle OB is a hand, a gesture of the hand is recognized. For example, a feature corresponding to each gesture may be pre-stored in the storage device of the host 130. When the obstacle OB is determined to be a hand, the feature of the obstacle OB may be matched with the stored gestures. If the feature of the hand is matched with a certain stored gesture, the gesture of the obstacle OB may be determined to be the matched gesture. Otherwise, it is determined that the obstacle OB is not a gesture.

In some embodiments, the controller 132 may be configured to perform the above-mentioned matching process. For example, the controller 132 may be configured to determine the meaning of the gesture based on the matching result by matching with the pre-stored gesture model.

When a single UWB antenna is used, a blind area may appear in the recognition process due to a limited detection angle of the single UWB antenna. Thus, precision of micro-gesture recognition may be difficult to ensure. In order to obtain the multi-angle UWB reflected signals SR, the present disclosure provides the solution with the plurality of UWB antennas A. In addition, in the present disclosure, the plurality of UWB antennas A should be arranged at distances as far away as possible from each other. Thus, the spatial 3D model of the obstacle OB with more complete information may be obtained. Otherwise, if the plurality of UWB antennas A are close to each other, an effect similar to the single antenna may be obtained. In the present disclosure, by using the plurality of UWB antennas spaced far enough away from each other to replace the single UWB antenna, the reflected signals of the hand may be obtained from a plurality of angles. Thus, the 3D feature of the hand may be formed, which is more beneficial to determining the gesture. In addition, the user micro-gesture may be more accurately recognized by the above method, which facilitates the precise control of the vehicle.

The principle of using the plurality of UWB antennas A to perform scanning and imaging is described in detail below.

Figure 5:
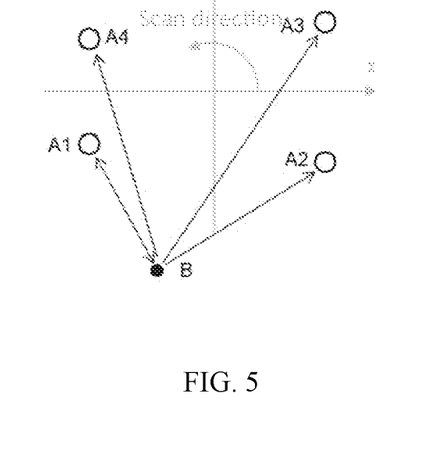
FIG. 5 is a schematic diagram showing a location of one point of a plurality of points that form an obstacle according to some embodiments of the present disclosure.

As shown in FIG. 5, the four UWB antennas A1-A4 emit the UWB pulse signals SG with the frequencies f1 to f4, respectively. In order to simplify the analysis of the problem, the positioning process of a unit in space (e.g., point B) may be analyzed first.

A plane coordinate system is established from a top view of the vehicle 100. For example, the coordinate origin may be set at the geometric center of the quadrilateral formed by the four UWB antennas A1 to A4.

The four UWB antennas A1 to A4 may scan through a same angle at the same time. The scan angular speed of the four UWB antennas A1 to A4 may be also the same as $\omega$ (°/s). When t=0 and a scan angle is 0°, the time required to scan one circle (360°) is 360/$\omega$ (s).

Since the scan angles when the four UWB antennas A1 to A4 scan to point B are different, the time points when the four UWB antennas A1 to A4 scan to point B may be also different. That is, time differences may exist when the four UWB antennas A1 to A4 scan to point B. However, since the scan speed can be very fast and far exceed moving speeds of objects outside the vehicle 100, point B may be considered to not move when the four UWB antennas A1 to A4 scan to point B, and the time differences may be ignored. In order to simplify the analysis of the problem, the four UWB antennas A1 to A4 may be considered to scan to point B at the same time.

A distance from UWB antenna Ax to point B may be set to L(Ax-B). The four UWB antennas A1 to A4 may simultaneously emit UWB pulse signals SG1 to SG4 with frequencies f1 to f4, respectively.

A first UWB pulse signal SG1 emitted by a first UWB antenna A1 at a first frequency f1 may be propagated to point B and reflected by point B. A first UWB reflected signal SR1 reflected by point B may be reflected back to four UWB antennas A1 to A4. Then, first UWB reflected signal SR1 may be received by four UWB antennas A1 to A4. A sum of an emitting distance and a receiving distance of first UWB pulse signal SG1 may be calculated (by the TOF, received signal strength, etc.). The UWB pulse signals SG may be collectively referred to as a signal round-trip distance L(Ax-Ay). For example, L(A1-A4) is the round-trip distance of a signal emitted by first UWB antenna A1 and reflected back to fourth UWB antenna A4. Therefore, L(A1-B)=L(A1-A1)/2, L(A2-B)=L(A1-A2)−L(A1-B), L(A3-B)=L(A1-A3)−L(A1-B), and L(A4-B)=L(A1-A4)−L(A1-B). Thus, the distances from four UWB antennas A1 to A4 to point B may be obtained.

According to the principle of 3D geometry, the distances from point B to four UWB antennas A1 to A4 at known spatial positions may be obtained. Then, the position of point B can be determined. For example, a spatial coordinate of point B may be marked as (x1, y1, z1). Similarly, when second UWB antenna A2, third UWB antenna A3, and fourth UWB antenna A4 emit UWB pulse signals SG2, SG3, and SG4 with frequencies f2, f3, and f4, respectively, the spatial coordinates of point B (x2, y2, z2), (x3, y3, z3), and (x4, y4, z4) may be obtained.

Under a normal circumstance, the spatial coordinates of point B (x1, y1, z1), (x2, y2, z2), (x3, y3, z3), and (x4, y4, z4) may have a small error. In order to obtain the spatial position of point B more precisely, some calculation manners may be used to reduce the error.

For example, an arithmetic mean of the spatial coordinates (x1, y1, z1), (x2, y2, z2), (x3, y3, z3), and (x4, y4, z4) of point B may be calculated by following equation 1 to obtain a more precise spatial position of point B.

$$(x,y,z)=[(x1,y1,z1)+(x2,y2,z2)+(x3,y3,z3)+(x4,y4,z4)]/4 \quad \text{Equation 1:}$$

In addition, the error may be further reduced by calculating a weighted mean of the spatial coordinates (x1, y1, z1), (x2, y2, z2), (x3, y3, z3), and (x4, y4, z4) of point B. The farther the measurement distance is, the larger the error is. Therefore, if point B is closer to an emitting antenna, the measurement error may be smaller, and the weight may be increased. If point B is farther away from the emitting antenna, the measurement error may be larger, and the weight may be reduced. For example, the weighted mean of the spatial coordinates of point B may be calculated as follows.

(1) According to (x1, y1, z1), point B may be determined to be on a left side of the vehicle 100, then (x, y, z)=[(x1, y1, z1)+(x2, y2, z2)+2*(x3, y3, z3)+2*(x4, y4, z4)]/(2+2+1+1);
(2) According to (x1, y1, z1), point B may be determined to be on a right side of the vehicle 100, then (x, y, z)=[2*(x1, y1, z1)+2*(x2, y2, z2)+(x3, y3, z3)+(x4, y4, z4)]/(2+2+1+1);
(3) According to (x1, y1, z1), point B may be determined to be in front of the vehicle 100, then (x, y, z)=[(x1, y1, z1)+2*(x2, y2, z2)+2*(x3, y3, z3)+(x4, y4, z4)]/(2+2+1+1);
(4) According to (x1, y1, z1), point B may be determined to be behind the vehicle 100, then (x, y, z)=[2*(x1, y1, z1)+(x2, y2, z2)+(x3, y3, z3)+2*(x4, y4, z4)]/(2+2+1+1).

The arithmetic mean and weighted mean are merely exemplary methods for calculating the spatial coordinates of point B. Another method may also be used to reduce the error of the spatial coordinates of point B to obtain a more precise spatial position of point B. In addition, another weighted mean method may also be used, the idea of which may be similar to that of the weighted mean calculation method.

The above is the method of obtaining the spatial coordinates of single point B. If the obstacle OB is a 3D object in space, the obstacle OB may be regarded as composed of an infinite number of points B1, . . . , Bn. By using the above method, spatial coordinates of these points may be also obtained. According to the spatial coordinates of these points, the overall shape of the obstacle OB around the vehicle 100 may be restored.

Then, the spatial 3D shape of the obstacle OB in a predetermined time period may be determined in combination with periodic scanning of the UWB antenna A. Thus, a change in the spatial 3D shape of the obstacle OB may be determined to recognize the gesture.

At S250, an operation command corresponding to the determined gesture may be output to control the vehicle 100 to perform a corresponding operation.

When a user desires to control the vehicle from the outside of the vehicle, the user may make a gesture outside the vehicle. The user gesture may be recognized through processes S210 to S240. Based on the recognition result, the vehicle may be controlled to perform an operation corresponding to the user gesture in process S250. Thus, the user can control the vehicle from the outside of the vehicle.

In some embodiments, when the controller 132 determines that the meaning of the gesture is to increase or decrease the volume, the controller 132 may control a volume control circuit 134 of an entertainment apparatus of the vehicle 100 to control the volume of a trumpet 142 of the vehicle 100 or a speaker of the entertainment apparatus (e.g., an external speaker, including but not limited to a vibrator sound panel). For example, when the controller 132 determines that the meaning of the gesture is to open or close a window, the controller 132 may control a window motor 144 of the vehicle 100 to perform a corresponding operation. Similarly, the controller 132 may be further configured to control a door motor 145, a rear trunk motor 146, a door lock 147, a rear trunk lock 148, and a vehicle light control circuit 149 to perform corresponding operations based on the meaning of the determined gesture.

When the vehicle 100 is controlled to execute the operation command corresponding to the recognized gesture, if there are a plurality of contradictory operation commands at the same time, the vehicle 100 may not execute any operation.

In a first example, if the user swings the hand downwardly beside a certain window of the vehicle 100, the vehicle 100 may be controlled to perform an operation of opening the window downward based on the recognized gesture.

In a second example, on a side of a certain window of the vehicle 100, if a first user and a second user swing hands at the same time, the first user may swing the hand upward, and the second user may swing the hand downward. Since the operation commands are contradictory, the vehicle 100 may not perform any operation.

In a third example, if the user swings the hand upward beside the rear trunk of the vehicle 100, the vehicle 100 may be controlled to perform an operation of upwardly opening the rear trunk lid based on the recognized gesture.

In other examples, when the user swings the hand outward beside the door of the vehicle 100, the door may be opened. When the user swings the hand inward beside the door of the vehicle 100, the door may be closed. When the user swings the hand upward beside the rear trunk of the vehicle 100, the trunk lid may be opened. When the user swings the hand downwardly beside the rear trunk of the vehicle 100, the rear trunk lid may be closed. When the user swings the hand upwardly beside the window of the vehicle 100, the window may be closed. When the user swings the hand downwardly beside the window of the vehicle 100, the window may be opened. When the user puts the hand flat next to the vehicle 100 and slowly raise the hand upwardly, the volume may be gradually increased. When the user puts the hand flat next to the vehicle 100 and slowly lowers the hand downwardly, the volume may be gradually decreased. When the user holds the hand vertically and moves slowly to the left beside the vehicle 100, the music may be switched to a previous song. When the user holds the hand vertically and moves slowly to the right beside the vehicle 100, the music may be switched to a next song. When the user points a finger to a headlight and clicks in front of the vehicle 100, the vehicle 100 may switch among low beam, high beam, and off.

In order to improve the gesture recognition rate, the number of UWB antennas A may be increased. The plurality of antennas may obtain the reflected signals of the obstacle OB from a plurality of angles. Thus, the spatial 3D feature of the obstacle OB may be formed, which is more beneficial to determining the gesture. For example, as shown in FIG. 1 and FIG. 3, a distribution diagram of the plurality of UWB antennas A is shown. The plurality of UWB antennas A may be spaced by a certain distance to obtain the UWB reflected signals SR of the obstacle OB with a plurality of angles.

In some embodiments, since the UWB antennas A may also pass through the body of the vehicle 100 and enter the inside of the vehicle 100. Thus, the inside of the vehicle 100 may be also covered by the UWB antennas A. Therefore, the gesture recognition may also be performed inside the vehicle 100 to control the vehicle 100 to perform the corresponding operations.

In some embodiment, whether the vehicle 100 is in an awake state may be determined before an operation command corresponding to the recognized gesture is output to control the vehicle 100 to perform the corresponding operation. If the vehicle 100 is determined to be not awake, the vehicle 100 may be woken by making a specific gesture by the hand. If the vehicle 100 is determined to be awake, different components of the vehicle 100 may be controlled by different gestures according to the method described above to perform the operations corresponding to the recognized gestures.

For example, a component of the vehicle 100 to be controlled by a gesture may be determined based on the position where the gesture is made. As an example but not for the purpose of limitation, when a gesture is made at the front left door of the vehicle 100, the component to be controlled by the gesture may be determined to be the front left door, a left window, or a left turning light. Then, the gesture may be matched with the predetermined gestures for controlling the front left door, the left window, and the left turning light to determine the specific component that is to be controlled. When the gesture is made directly in front of the vehicle, the component that needs to be controlled may be determined to be vehicle headlights, wipers, or a sunroof (if any). Then, the specific component that is to be controlled may be determined according to whether the gesture made matches the predetermined gestures for controlling the headlights, the wipers, and the sunroof.

In addition, the components of the vehicle 100 to be controlled by the gesture may be further determined based on a direction pointed by the gesture. For example, when the user makes a gesture pointing to the front left on one side of the vehicle facing forward (that is, the direction in which the head of the vehicle faces), the component to be controlled by the gesture may be determined to be the component at the front left of the vehicle. When the user makes a gesture pointing to the front right, the component to be controlled by the gesture may be determined to be the component at the front of the vehicle. When the user makes a gesture pointing to the front left on one side of the vehicle facing the backward (i.e., the direction pointed by the rear of the vehicle), the component to be controlled by the gesture may be determined to be the component at the rear right of the vehicle. When the user makes a gesture point to the front right, the component to be controlled by the gesture may be determined to be the component at the rear left of the vehicle. Then, the specific component that is to be controlled may be determined by matching the recognized gesture with the predetermined control gesture of the determined possible component.

The components that are to be controlled may be further determined based on a combined gesture. For example, a plurality of predetermined gestures may be predefined, each gesture may correspond to a different component of the vehicle. After the component that is to be controlled of the vehicle is determined through a first gesture, when a second gesture is recognized within a predetermined time (for example but not limited to 1 second), the specific operation of the component may be controlled through a command corresponding to the second gesture.

For example, gesture A may represent a control component as a left window, gesture B may represent a control component as a right window, gesture C may represent a control component as a rear trunk, gesture D may represent an opening operation, and gesture E represents a closing operation.

When the left window is closed, if the user makes gesture A and gesture D within 1 second in sequence, the left window may be opened. If the user makes gesture A first, and then makes gesture D after 1 second, since the time for making gesture D exceeds the predetermined 1 second, no operation may be performed on any component of the vehicle.

When the left window is open, if the user makes gesture A and gesture D within 1 second in sequence, since the left window is opened, no operation may be performed on any component of the vehicle.

When the user makes gesture E and gesture B in sequence, since no operation corresponds to the combination, no operation may be performed on any component of the vehicle.

When both the left and right windows are closed and only the rear trunk is opened, if the user only makes gesture E, the operation that is to be performed may also be determined to be closing the rear trunk. In the above manner, different components of the vehicle may be controlled more simply and more precisely from the outside of the vehicle based on the location where the gesture is made, the pointing direction of the gesture, and the combination of the gestures. The above description of the gestures may be only for illustrating an exemplary method for implementing the technical solutions of the present disclosure, and does not limit it in any manner. All possible embodiments that can be inferred or thought of by those skilled in the art based on the above description should be within the scope of the present disclosure.

In some other embodiments, for example, the vehicle 100 may include a recognition device 150. The recognition device 150 may be communicatively connected to the controller 132 of the host 130. When the user with an authorized device approaches the vehicle 100, the recognition device 150 may recognize whether a distance between the authorized device and the vehicle 100 is less than a predetermined threshold. The recognition device 150 may send the recognition result to the controller 132. The controller 132 may be configured to determine whether to allow the vehicle 100 to be controlled by the gesture based on the recognition result of the recognition device 150. For example, when the recognition device 150 recognizes that the distance between the authorized device and the vehicle 100 is smaller than the predetermined threshold, the controller 132 may allow the vehicle 100 to be controlled by the gesture. Thus, gesture recognition may be performed only when the vehicle 100 recognizes the authorized device. Therefore, illegal operation by an unauthorized user may be prevented, which may improve the safety of the vehicle. Since the operation may be performed by satisfying double verification of user identity and gesture recognition. Thus, possibility of error operation may be reduced.

In embodiments of the present disclosure, a user gesture may be detected by using the plurality of UWB antennas to realize the gesture recognition function. The vehicle may be controlled to perform corresponding operations from the outside or inside of the vehicle. Since the user does not need to actively obtain the control authority, does not need to substantially touch the vehicle, and does not need to carry any mobile device, the vehicle can be controlled in a simpler and more convenient manner, and the user operation experience may be further improved.

Figure 6:
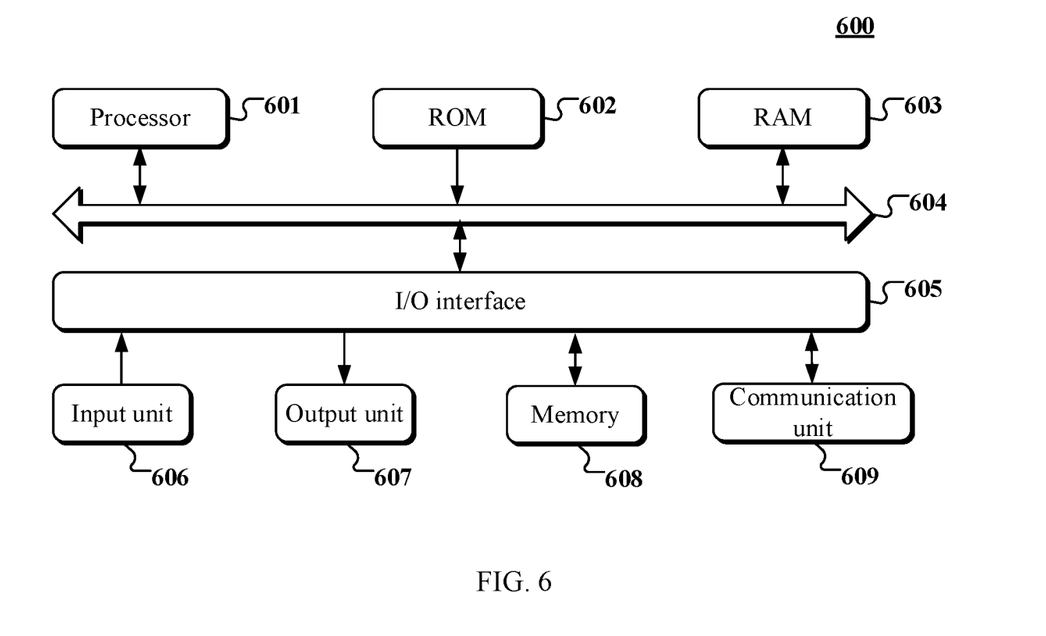
FIG. 6 is a schematic block diagram of an electronic apparatus configured to control a vehicle by recognizing a gesture based on a UWB according to some embodiments of the present disclosure.

FIG. 6 is a schematic block diagram of an electronic apparatus 600 configured to control a vehicle by recognizing a gesture based on a UWB according to some embodiments of the present disclosure. The electronic apparatus 600 may include various forms of digital computers, such as a laptop, a desktop, a workstation, a personal digital assistant, a server, a blade server, a largescale computer, and another suitable computer. The electronic apparatus 600 may further include various forms of mobile devices, such as a personal digital processor, a cellular phone, a smartphone, a wearable device, and other similar computation devices. In the present specification, the components, connections and relationships of the components, and functions of the components may be only used as examples, and are not intended to limit implementations of the present disclosure described and/or claimed in the specification.

As shown in FIG. 6, the device 600 includes a processor 601. The processor 601 may be configured to, according to the computer program in a read-only memory (ROM) 602 and the computer program loaded to a random-access memory (RAM) 603 from a memory 608, perform various suitable actions and processes. In the RAM 603, various programs and data required for performing the operation of the device 600 may be also stored. The processor 601, the ROM 602, and the RAM 603 are connected to each other through a bus 604. An I/O interface input/output (I/O) interface 605 is also connected to the bus 604.

A plurality of components of the device 600 are connected to the I/O interface 605 and include an input unit 606, such as a keyboard, a mouse, etc., an output unit 607, such as various types of displays, speakers, etc., the memory 608, such as a disk, CD-ROM, etc., and a communication unit 609, such as a network card, a modem, a wireless communication transceiver, and etc. The communication unit 609 may be configured to allow the device 600 to exchange information/data with other devices through a computer network such as the Internet and/or various telecommunication networks.

The processor 601 may include various general-purpose and/or special-purpose processing assemblies having processing and computation capabilities. Some examples of the processor 601 may include, but are not limited to, a central processing unit (CPU), a graphics processing unit (GPU), various specialized artificial intelligence (AI) computation chips, various processors that run machine learning model algorithms, a digital signal processing processor (DSP), and any suitable processor, controller, microcontroller, etc. The processor 601 may be configured to perform the various methods and processes described above, such as the method for closing the rear trunk. For example, in some embodiments, the method for closing the rear trunk may be implemented as a computer software program that is tangibly included in a machine-readable storage medium, such as the memory 608. In some embodiments, a part or all of the computer program may be loaded and/or installed on the electronic device 600 via the ROM 602 and/or the communication unit 609. When the computer program is loaded into the RAM 603 and executed by the processor 601, one or more steps of the method for closing the rear trunk described above may be performed. Alternatively, in some other embodiments, the processor 601 may be configured by any other suitable manners (e.g., supported by firmware) to perform the method for closing the rear trunk.

Various embodiments of the systems and techniques described in the specification above may be implemented in a digital electronic circuit system, an integrated circuit system, a field programmable gate array (FPGA), an application-specific integrated circuit (ASIC), an application-specific standard product (ASSP), a system-on-a-chip (SOC), a complex programmable logic device (CPLD), computer hardware, firmware, software, and/or a combination thereof. These various embodiments may be implemented in one or more computer programs. The one or more computer programs may be executed and/or interpreted on a programmable system including at least one programmable processor. The programmable processor may include a special-purpose or general-purpose programmable processor, may receive data and instructions from a storage system, at least one input device, and at least one output device, and transmit the data and the instructions to the storage system, the at least one input device, and the at least one output device.

Computer programs used to implement the method of the present disclosure may be written in any combination of one or more programming languages. The above program codes may be packaged into a computer program product. The program codes or the computer program product may be provided to a processor or controller of a general-purpose computer, a special-purpose computer, or another programmable data processing apparatus. Thus, the program code, when executed by processor 601, causes the functions/operations defined in the flowcharts and/or block diagrams to be implemented. The program codes may be executed on the machine, partially on the machine, partially on the machine as an independent software package and partially on a remote machine, or entirely on the remote machine or server.

In the context of the present disclosure, the machine-readable storage medium may be a tangible medium that may include or store the program for use by or in connection with an instruction execution system, apparatus, or device. The machine-readable storage medium may include a machine-readable signal storage medium or a machine-readable storage medium. The machine-readable storage medium may include but are not limited to, an electronic, magnetic, optical, electromagnetic, infrared, or semiconductor system, device, or device, or any suitable combination thereof. More specific examples of the machine-readable storage medium may include electrical connections based on one or more wires, portable computer disks, hard drives, a random access memory (RAM), a read-only memory (ROM), an erasable programmable read-only memory (EPROM or flash memory), fiber optics, a compact disk read-only memory (CD-ROM), an optical storage device, a magnetic storage device, or any suitable combination thereof.

To provide interaction with a user, the system and technology described herein may be implemented on a computer. The computer may include a display device (e.g., a cathode ray diode (CRT) or a liquid crystal display (LCD) monitor) configured to display information to the user, a keyboard, and a pointing device (e.g., a mouse or trackball). The user may provide the input to the computer through the keyboard and the pointing device. Other kinds of devices may also be configured to provide interaction with the user. For example, the feedback provided to the user may be any form of sensory feedback (e.g., visual feedback, auditory feedback, or tactile feedback), the input from the user may be received in any form (including acoustic input, voice input, or tactile input).

The system and technology described here may be implemented in a computation system that includes a back-end component (e.g., as a data server), a computation system that includes a middleware component (e.g., an application server), or a computation system that includes a front-end component (e.g., a user computer having a graphical user interface or web browser, through which the user may interact with implementations of the system and technology described here), or the back-end component, the intermediate component, or any combination of the front-end component in the computation system. The components of the system may be connected to each other by any form or medium of digital data communication (e.g., a communication network). The communication network may include a local area network (LAN), a wide area network (WAN), and the Internet.

A computer system may include a client end and a server end. The client end and the server end may be generally spaced away from each other and usually interact with each other through a communication network. The relationship between the client end and the server end may be generated by executing the computer programs that have the client end-server end relationship on the corresponding computer. The server may include a cloud server, also known as a cloud computation server or a cloud host, which is a host product in the cloud computation service system to solve a defect of difficult management and weak business expansion in a traditional physical host and a virtual private server (VPS) service. The server may include a distributed system server or a server combined with a blockchain.

The various forms of flowcharts may be used and re-arranged to add or delete steps. For example, the steps described in the present disclosure may be executed in parallel, in sequence, or in a different order. As long as the desired result of the technical solution of the present disclosure may be achieved, the execution of the steps may not be limited.

Specific embodiments do not constitute a limitation on the scope of the present disclosure. Those skilled in the art should understand that various modifications, combinations, sub-combinations, and replacements may be performed according to design requirements and other factors. Any modifications, equivalent replacements, and improvements made within the spirit and principle of the present disclosure shall be within the scope of the present disclosure.

What is claimed is:

1. A vehicle control method comprising:
    emitting a plurality of pulse signals through a plurality of ultra-wideband (UWB) antennas, neighboring UWB antennas of the plurality of UWB antennas are spaced away at a predetermined distance, the plurality of pulse signals being reflected by an obstacle during outward propagation to generate a plurality of reflected signals;
    receiving the plurality of reflected signals and determining time-of-flight (TOF) and signal strength of each reflected signal of the plurality of received reflected signals;
    determining whether the obstacle is a hand according to the TOF and the signal strength of the reflected signal;
    in response to determining that the obstacle is the hand, recognizing a gesture of the hand;
    outputting an operation command corresponding to the gesture to control a vehicle to perform a corresponding operation; and
    executing the operation command at the vehicle,
    wherein receiving the reflected signals includes obtaining the reflected signals reflected by the obstacle from different angles through each of the plurality of UWB antennas, and wherein determining whether the obstacle is the hand according to the TOF and the signal strength of each of the reflected signals includes: establishing a spatial three-dimensional (3D) model of the obstacle based on the spatial location of the neighboring UWB antennas, the TOF and the signal strength of each reflected unit of the reflected signals of different frequencies; and determining whether the obstacle is the hand according to the 3D spatial model.

2. The method according to claim 1, wherein determining whether the obstacle is the hand according to the TOF and the signal strength of the reflected signal includes:
    determining a location and a shape of the obstacle based on the determined TOF and the signal strength of the reflected signal; and
    based on the location and shape of the obstacle, determining whether the obstacle is the hand.

3. The method according to claim 2, wherein determining the location of the obstacle includes:
    for each UWB antenna of the plurality of UWB antennas, determining a precise spatial location of each of a plurality of units that form the obstacle based on the determined TOF; and
    combining the precise spatial location of each of a plurality of units to obtain a spatial 3D shape of the obstacle.

4. The method according to claim 3, wherein recognizing the gesture of the hand includes:
    recognizing the gesture of the hand according to a change of the spatial 3D shape of the obstacle determined within a predetermined time period.

5. The method according to claim 1, further comprising:
    determining whether the operation command includes a plurality of contradictory commands with a same time period; and
    in response to the operation command including the plurality of contradictory commands within the same time period, not outputting a command to perform any operation by the vehicle.

6. The method according to claim 1, wherein emitting the plurality of pulse signals through the plurality of UWB antennas includes:
    controlling each of the plurality of UWB antennas to emit the pulse signals having a different frequency.

7. The method according to claim 6, wherein establishing the spatial 3D model of the obstacle further includes:
    establishing a plurality of spatial 3D sub-models of the obstacle based on the spatial locations of the neighboring UWB antennas, the TOF and the signal strength of each reflected unit of the reflected signals of each frequency; and
    combining the plurality of spatial 3D sub-models to obtain the spatial 3D model.

8. The method according to claim 1, wherein outputting the operation command corresponding to the gesture to control the vehicle to perform the corresponding operation includes:
    when the vehicle is not awake, waking up the vehicle based on a particular gesture of the hand.

9. The method according to claim 1, wherein outputting the operation command corresponding to the gesture to control the vehicle to perform the corresponding operation includes:
in response to the vehicle being awake, controlling components of the vehicle to perform an operation corresponding to the gesture.

10. The method according to claim 1, wherein the outputting the operation command corresponding to the gesture to control the vehicle to perform the corresponding operation includes:
determining a corresponding component of the vehicle that is to be controlled by the gesture based on the location where the gesture is made; and
controlling the determined corresponding component by the gesture to perform the corresponding operation.

11. The method according to claim 1, wherein outputting the operation command corresponding to the gesture to control the vehicle to perform the corresponding operation includes:
determining a corresponding component of the vehicle that is to be controlled by the gesture based on a location where the gesture is made and a direction pointed by the gesture; and
controlling the determined corresponding component by the gesture to perform the corresponding operation.

12. The method according to claim 1, wherein outputting the operation command corresponding to the gesture to control the vehicle to perform the corresponding operation includes:
after determining a component that is to be controlled by a first gesture, controlling the component to perform an operation corresponding to a second gesture based on the second gesture being made within a predetermined time after the first gesture is made.

13. An electronic apparatus comprising:
a plurality of ultra-wideband (UWB) antennas, neighboring UWB antennas of the plurality of UWB antennas being spaced away at a predetermined distance;
a memory storing a program; and
a processor coupled with the memory and, when the program being executed, configured to:
emit a plurality of pulse signals through the plurality of UWB antennas, the plurality of pulse signals being reflected by an obstacle during outward propagation to generate a plurality of reflected signals;
receive the reflected signals and determine time-of-flight (TOF) and signal strength of each of the received reflected signals;
determine whether the obstacle is a hand according to the TOF and the signal strength of each of the reflected signals;
in response to determining that the obstacle is the hand, recognize a gesture of the hand;
output an operation command corresponding to the gesture to control a vehicle to perform a corresponding operation; and
execute the operation command at the vehicle, wherein receiving the reflected signals includes obtaining the reflected signals reflected by the obstacle from different angles through each of the plurality of UWB antennas, and determining whether the obstacle is the hand according to the TOF and the signal strength of each of the reflected signals includes: establishing a spatial 3D model of the obstacle based on the spatial location of the neighboring UWB antennas, the TOF, and the signal strength of each reflected unit of the reflected signals of different frequencies; and determining whether the obstacle is the hand according to the 3D spatial model.

14. A vehicle comprising: a body; an ultra-wideband (UWB) apparatus arranged outside of the body and including a plurality of UWB antennas, neighboring UWB antennas of the plurality of UWB antennas being spaced away at a predetermined distance, the plurality of UWB antennas periodically emitting a plurality of pulse signals and receive a plurality of reflected signals generated by being reflected by an obstacle; a controller communicatively connected to the UWB apparatus, the controller being configured to: determine a time-of-flight (TOF) and a signal strength of each of the received reflected signals; determine whether the obstacle is a hand according to the TOF and the signal strength of each of the reflected signals; in response to determining that the obstacle is the hand, recognize a gesture of the hand; and output an operation command corresponding to the gesture to control the vehicle to perform a corresponding operation; and execute the operation command at the vehicle, wherein receiving the reflected signals includes obtaining the reflected signals reflected by the obstacle from different angles through each of the plurality of UWB antennas, and wherein determining whether the obstacle is the hand according to the TOF and the signal strength of each of the reflected signals includes: establishing a spatial three-dimensional (3D) model of the obstacle based on the spatial location of the neighboring UWB antennas, the TOF, and the signal strength of each reflected unit of the reflected signals of different frequencies; and determining whether the obstacle is the hand according to the 3D spatial model.

15. The vehicle according to claim 14, wherein the controller is further configured to:
determine a location and a shape of the obstacle based on the determined TOF and the signal strength of each of the reflected signals; and
based on the location and shape of the obstacle, determining whether the obstacle is the hand.

16. The vehicle according to claim 15, wherein the controller is further configured to:
for each of the plurality of UWB antennas, determine a precise spatial location of each of a plurality of units that form the obstacle based on the determined TOF; and
combine the precise spatial location of each of the plurality of units to obtain a spatial 3D shape of the obstacle.

17. The vehicle according to claim 16, wherein the controller is further configured to:
recognize the gesture of the hand according to a change of the spatial 3D shape of the obstacle determined within a predetermined time period.

18. The vehicle according to claim 14, wherein emitting the plurality of pulse signals through the plurality of UWB antennas includes:
controlling each of the plurality of UWB antennas to emit the pulse signals having a different frequency.

19. The vehicle according to claim 18, wherein establishing the spatial 3D model of the obstacle further includes:
establishing a plurality of spatial 3D sub-models of the obstacle based on the spatial locations of the neighboring UWB antennas, the TOF and the signal strength of each reflected unit of the reflected signals of each frequency; and combining the plurality of spatial 3D sub-models to obtain the spatial 3D model.

\* \* \* \* \*